US012786760B2

(12) United States Patent
Zhang et al.

(10) Patent No.: US 12,786,760 B2
(45) Date of Patent: Nov. 3, 2026

(54) SELECTING REFERENCE SIGNALS FOR DETERMINING BEAM FAILURE DETECTION AND RADIO LINK MONITORING

(71) Applicant: Apple Inc., Cupertino, CA (US)

(72) Inventors: Yushu Zhang, Beijing (CN); Chunhai Yao, Beijing (CN); Dawei Zhang, Saratoga, CA (US); Haitong Sun, Cupertino, CA (US); Hong He, San Jose, CA (US); Sigen Ye, Whitehouse Station, NJ (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 686 days.

(21) Appl. No.: 17/593,401

(22) PCT Filed: May 14, 2020

(86) PCT No.: PCT/CN2020/090133
§ 371 (c)(1),
(2) Date: Sep. 17, 2021

(87) PCT Pub. No.: WO2021/226903
PCT Pub. Date: Nov. 18, 2021

(65) Prior Publication Data

US 2022/0312237 A1 Sep. 29, 2022

(51) Int. Cl.
*H04W 24/08* (2009.01)
*H04L 5/00* (2006.01)

(52) U.S. Cl.
CPC ........... *H04W 24/08* (2013.01); *H04L 5/0048* (2013.01)

(58) Field of Classification Search
CPC ............................ H04W 24/08; H04L 5/0048
See application file for complete search history.

(56) References Cited

U.S. PATENT DOCUMENTS

| | | | | |
|---|---|---|---|---|
| 11,751,183 B2 * | 9/2023 | Hakola | ................. | H04W 36/36 370/329 |
| 2008/0084829 A1 * | 4/2008 | Visuri | .................. | H04L 1/0026 370/252 |

(Continued)

FOREIGN PATENT DOCUMENTS

| | | |
|---|---|---|
| CN | 110945897 | 3/2020 |
| CN | 110958634 | 4/2020 |

(Continued)

OTHER PUBLICATIONS

Samsung: "Corrections on Beam Failure Recovery", 3GPP TSG RAN WG1 Meeting #92, R1-1801963, Feb. 26-Mar. 2, 2018, 4 sheets.

(Continued)

*Primary Examiner* — Michael Thier
*Assistant Examiner* — Nevena Zecevic Sandhu
(74) *Attorney, Agent, or Firm* — Fay Kaplun & Marcin, LLP

(57) ABSTRACT

Embodiments include a computer readable storage medium, a user equipment, a method and an integrated circuit that perform operations. The operations include receiving a plurality of control resource sets (CORESETs), selecting at least one reference signal (RS) corresponding to at least one activated transmission configuration indicator (TCI) state in a CORESET, analyzing the at least one RS and determining beam failure detection (BFD) or radio link monitoring (RLM) based on the at least one reference signal selected.

18 Claims, 6 Drawing Sheets

(56) References Cited

U.S. PATENT DOCUMENTS

| | | | | |
|---|---|---|---|---|
| 2019/0190582 | A1* | 6/2019 | Guo | H04B 17/17 |
| 2019/0327687 | A1* | 10/2019 | Wang | H04W 72/0473 |
| 2020/0145982 | A1 | 5/2020 | Cheng et al. | |
| 2022/0294514 | A1* | 9/2022 | Kang | H04L 5/005 |
| 2023/0106244 | A1* | 4/2023 | Yu | H04L 5/0035 370/329 |
| 2023/0171062 | A1* | 6/2023 | Khoshnevisan | H04L 5/0085 370/329 |

FOREIGN PATENT DOCUMENTS

| | | |
|---|---|---|
| EP | 4 057 671 | 9/2022 |
| EP | 4 120 581 | 1/2023 |
| WO | 2019/138081 | 7/2019 |
| WO | 2019/153708 | 8/2019 |
| WO | 2019/215389 | 11/2019 |
| WO | 2020/054074 | 3/2020 |
| WO | 2020/090092 | 5/2020 |
| WO | 2021/182863 | 9/2021 |

OTHER PUBLICATIONS

Nokia et al., "Maintenance for Beam Management"; 3GPP TSG RAN WG1 Meeting #94bis; R1-1811404; Oct. 12, 2018; 5 sheets.

* cited by examiner

SELECTING REFERENCE SIGNALS FOR DETERMINING BEAM FAILURE DETECTION AND RADIO LINK MONITORING

BACKGROUND

A user equipment (UE) may establish a connection to at least one of a plurality of different networks or types of networks. When establishing the network connection such as, for example, a connection to a 5G new radio (NR) network, a g-NodeB (gNB) transmits downlink control information (DCI) to the UE via a physical downlink control channel (PDCCH) in a search space (SS).

The PDCCH and DCI are transmitted to the UE via one or more control resource sets (CORESETS), each of which includes a transmission configuration indicator (TCI) state configured by the gNB. The PDCCH may include a synchronization signal block (SSB) and a channel state information (CSI)-reference signal (RS) which the UE can use to determine a hypothetical block error rate (BLER). The UE uses the BLER to determine a beam failure detection (BFD) and/or radio link monitoring (RLM). When the hypothetical BLER for all RSs is above a predetermined threshold, the UE can count a beam failure instance (for BFD) or determine that the RSs are out of sync (for RLM).

SUMMARY

Some exemplary embodiments include a computer readable storage medium comprising a set of instructions that when executed by a processor cause the processor to perform operations. The operations include receiving a plurality of control resource sets (CORESETs), selecting at least one reference signal (RS) corresponding to at least one activated transmission configuration indicator (TCI) state in a CORESET, analyzing the at least one RS and determining beam failure detection (BFD) or radio link monitoring (RLM) based on the at least one reference signal selected.

Other exemplary embodiments are related to a user equipment (UE) that includes a transceiver and a processor. The is transceiver configured to connect to one or more g-NodeBs (gNBs). The processor is configured to receive a plurality of control resource sets (CORESETs) from the gNBs, select at least one reference signal (RS) corresponding to at least one activated transmission configuration indicator (TCI) state in a CORESET, analyze the at least one RS and determine beam failure detection (BFD) and radio link monitoring (RLM) based on the at least one reference signal selected.

DETAILED DESCRIPTION

Figure 1:
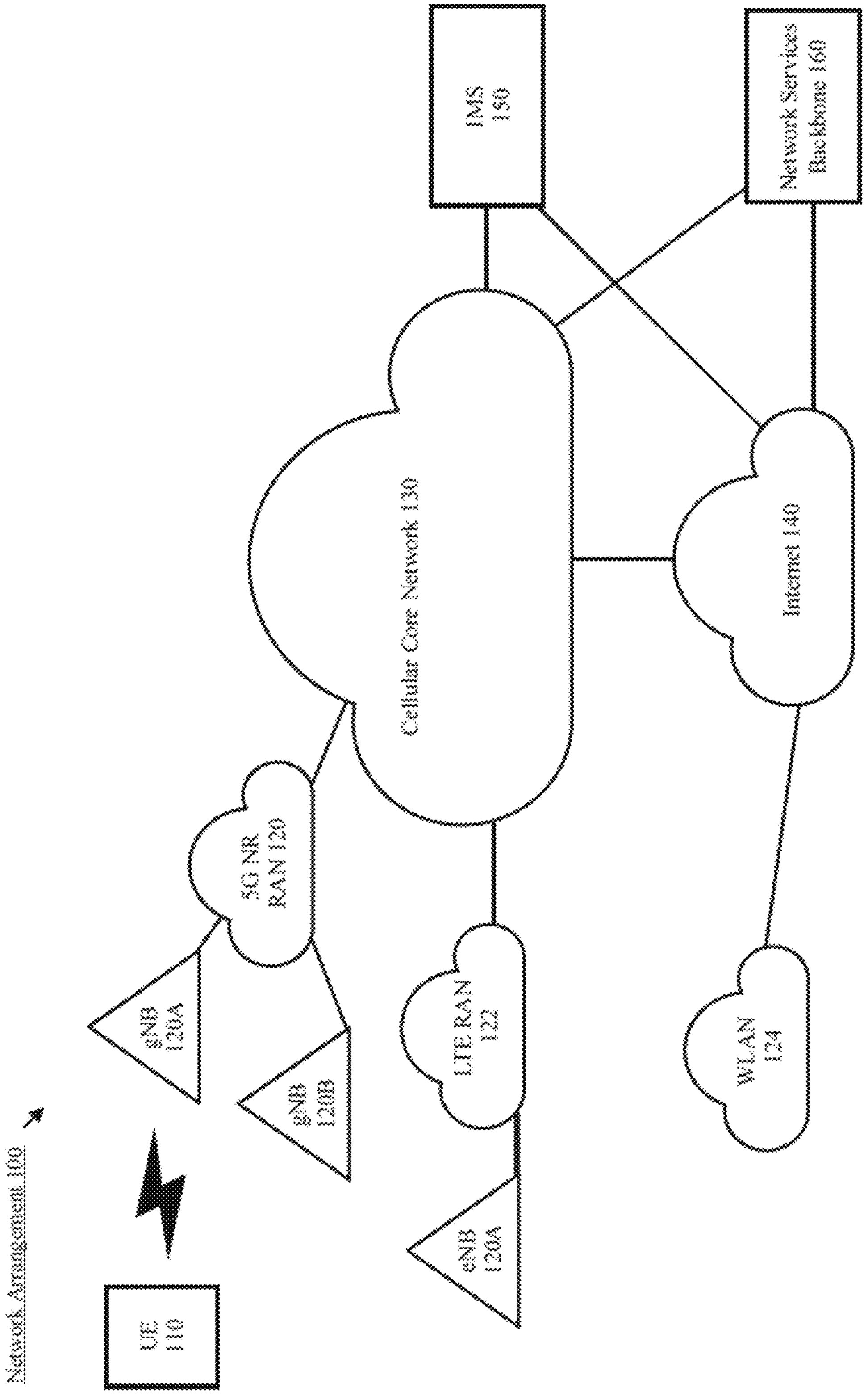
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) sending UCI information to a g-node B (gNB) of a 5G new radio (NR) network. The exemplary embodiments relate to the reception and robustness of reception of the PDCCH by the UE.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio NR radio access technology (RAT). However, the exemplary embodiments are not limited to 5G RATs as the exemplary embodiments may be applied to any network that includes the functionalities (whether described using the same terms or different terms) described herein for the 5G RAT, e.g., beamforming, reference signals, TCI states, etc.

Currently, the PDCCH includes one TCI state configured for each CORESET. According to the exemplary embodiments, each CORESET may be configured with multiple TCI states by the gNB such that one PDCCH may be transmitted via multiple beams. In such a scenario, the UE is configured to select one or more reference signals (RSs) from the TCI states of the CORESETs and/or calculate a hypothetical block error rate (BLER) for selection of RSs to be used in beam failure detection (BFD) and radio link monitoring (RLM). However, in such an arrangement, the UE may have to determine how to select the RS(s) to perform the RLM/BFD and detect the hypothetical BLER based on these RS(s). The exemplary embodiments will also address these issues.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UE 110 may be within range of a plurality of gNBs. Thus, either simultaneously or alternatively, the UE 110 may also connect to the 5G NR-RAN 120 via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
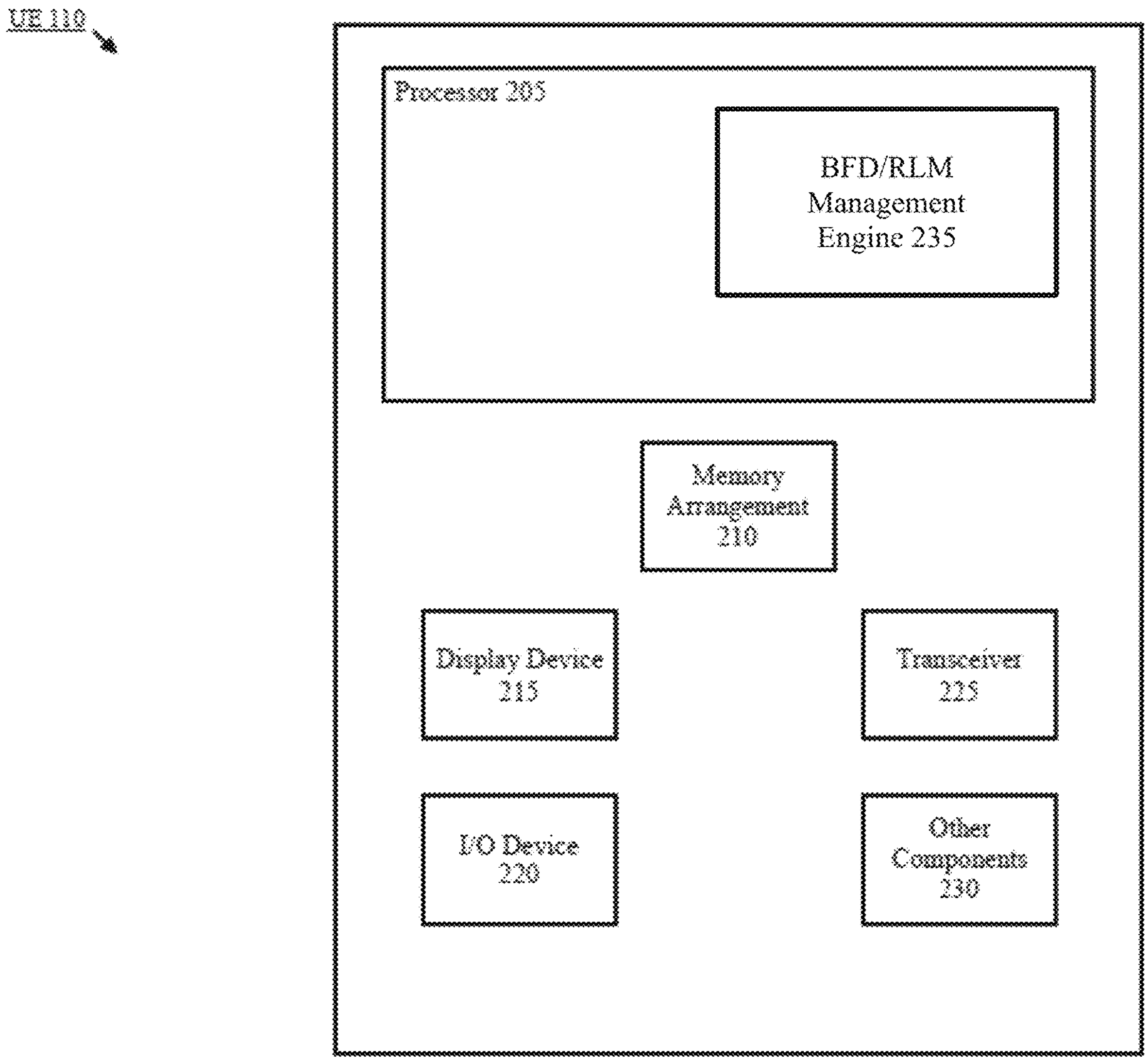
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc.

The processor 205 may be configured to execute a plurality of engines of the UE 110. For example, the engines may include a BFD/RLM management engine 235. The BFD/RLM management engine 235 may perform various operations related to selecting one or more RSs configured in a TCI state of a CORESET, determining a BLER of the selected RS(s), and/or determining the BFD and RLM based on the RS(s).

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3A:
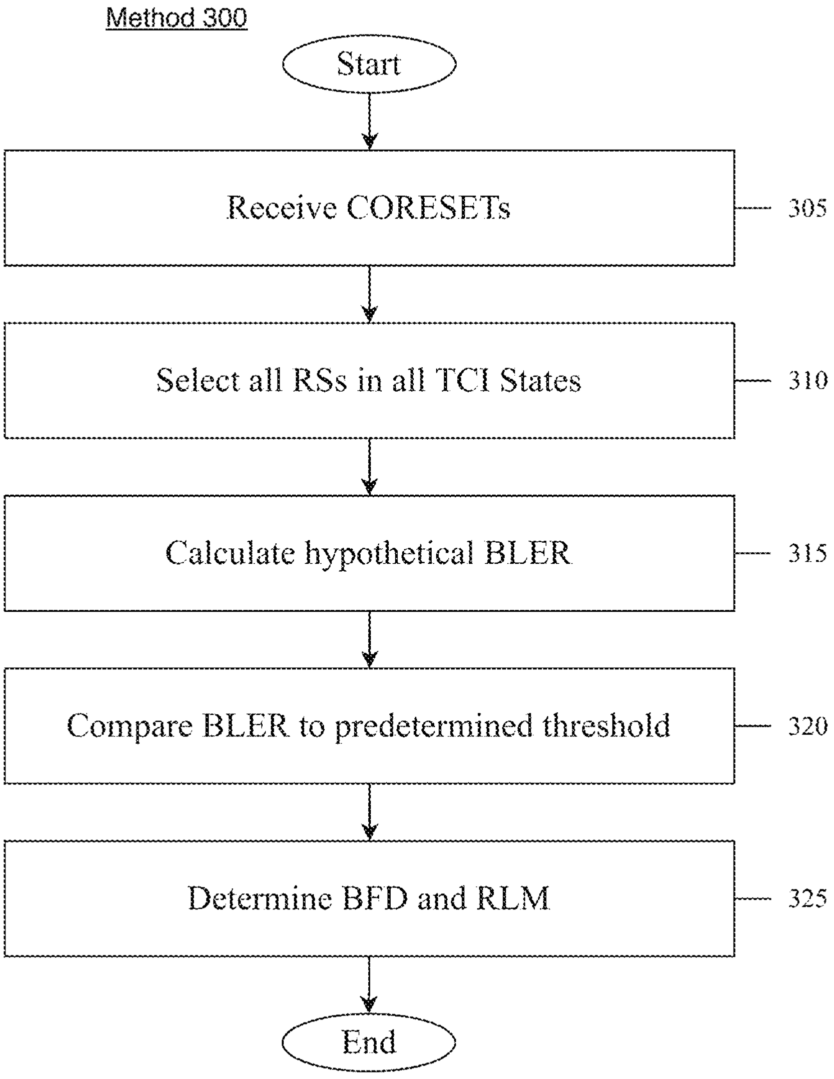
FIG. 3A shows a method of determining a reference signal(s) (RS) for beam failure detection and radio link monitoring according to various exemplary embodiments.

FIG. 3A shows a method 300 of determining a RS for beam failure detection and radio link monitoring according to various exemplary embodiments. The method 300 is performed by the UE 110 and allows for the selection of RS(s) to determine BFD and RLM. At 305, the UE receives the CORESETs configured by the gNB 120A or 120*b*. In some embodiments, the gNB may explicitly configure the RS that the UE 110 is to use for BFD and RLM. In such a scenario, the method 300 skips to 320 and determines the BFD and RLM using the explicitly configured RS. However, if the gNB does not explicitly configure a BFD/RLM RS, the method proceeds to 310.

At 310, the UE selects all the RSs in all of the TCI states of the CORESETs. Subsequently, at 315 the UE 110 calculates a hypothetical BLER for these RSs. In some embodiments, the UE 110 calculates the hypothetical BLER for each of the selected RSs. In some embodiments, the UE 110 calculates a combined hypothetical BLER for all of the selected RSs.

In some embodiments, the combined hypothetical BLER is determined using a signal to interference and noise ratio (SINR) from all of the RSs. In some embodiments, the minimum SINR may be used to determine the combined hypothetical BLER. In some embodiments, the maximum SINR may alternatively be used to determine the combined hypothetical BLER. In some embodiments, the average SINR may alternatively be used to determine the combined hypothetical BLER.

In some embodiments, the combined hypothetical BLER is determined using measured BLER from all of the RSs. In some embodiments, the minimum measured BLER may be used to determine the combined hypothetical BLER. In some embodiments, the maximum measured BLER may alternatively be used to determine the combined hypothetical BLER. In some embodiments, the average measured BLER may alternatively be used to determine the combined hypothetical BLER.

From the above examples, it can be seen that there are multiple mathematical and/or statistical manners of combining the measurements for the RSs to calculate the hypothetical BLER. Thus, it should be understood that the exemplary embodiments may include any manner of combining the RS measurements.

Typically, the gNB uses the same transmission power to transmit different RSs. However, in some instances, a difference in transmit power (power offset) between the selected RSs may exist. In such a case, the UE 110 may take the power offset into consideration when determining the combined hypothetical BLER. In some embodiments, the minimum power offset may be used to determine the combined hypothetical BLER. In some embodiments, the maximum power offset may be used to determine the combined hypothetical BLER. In some embodiments, the average power offset may be used to determine the combined hypothetical BLER. It should be noted that in such a scenario, the gNB 120A or 120B may communicate the power offset of each RS with the UE 110 via radio resource control (RRC) signaling.

At 320, the UE 110 compares either the calculated hypothetical BLER for each of the RSs or the combined hypothetical BLER with a predetermined threshold value. If the hypothetical BLERs for all of the selected RSs is above the predetermined threshold value, the UE 110 determines that a beam failure instance (for BFD purposes) and/or an out of sync beam (for RLM purposes) exists at 325.

Figure 3B:
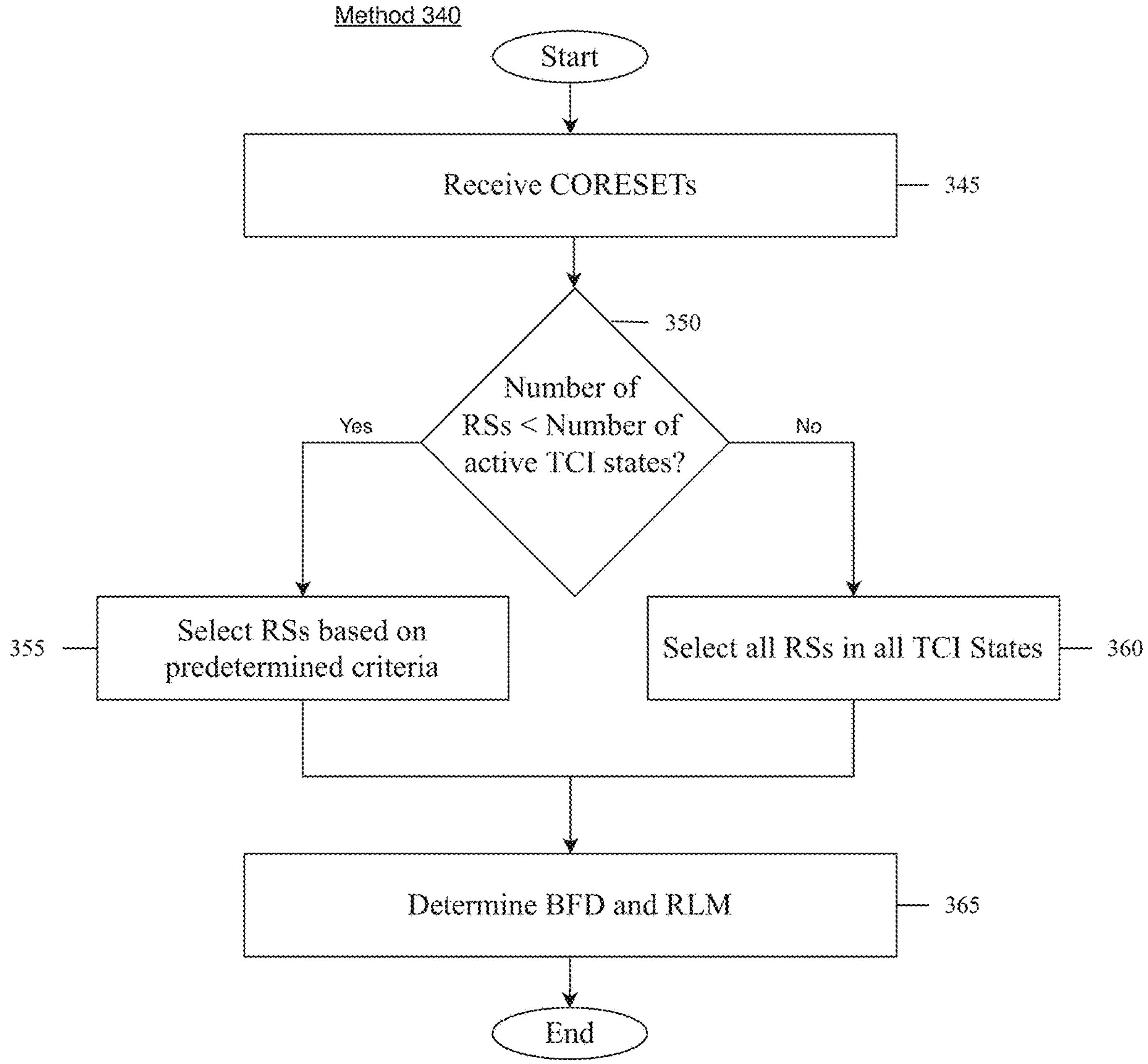
FIG. 3B shows a method of determining a RS for beam failure detection and radio link monitoring according to various exemplary embodiments.

FIG. 3B shows a method 340 of determining a RS for beam failure detection and radio link monitoring according to various exemplary embodiments. The method 350 is also performed by the UE 110 and allows for the selection of RSs to determine BFD and RLM. In some cases, the gNB 120*a* or 120*b* may send several CORESETS. At times, the number of CORESETs (active TCI states) may exceed the number of RSs that the UE 110 may utilize to determine BFD/RLM. In such cases, the UE 110 may prioritize and select a subset of the CORESETs.

At 345, the UE 110 receives the CORESETs configured by the gNB 120A or 120B. At 350, the UE 110 determines whether the number of RSs that may be used for BFD/RLM is less than a number of active TCI states in the active bandwidth part that includes the CORESET. If, the number of RSs is less than the number of active TCI states, the UE proceeds to 355, which is discussed below. If the number of RSs is not less than the number of active TCI states, the UE 110 proceeds to 360, where the UE 110 selects all of the RSs in all of the TCI states. If all the RSs are selected, the method may proceed as described above with reference to 315-320 of FIG. 3A.

At 355, since the number of RSs to be used for BFD/RLM is less than the number of active TCI states, the UE 110 selects the RSs for BFD/RLM based on, for example, the number of TCI states in a given CORESET, a periodicity of an associated search space (SS), or a CORESET ID. In some exemplary embodiments, the UE 110 first gives CORESET (s) with a higher number of active TCI states a higher priority. If two or more CORESETs have the same number of active TCI states, the CORESET with a smaller minimal periodicity among associated SSs may be selected. If the minimal periodicity is the same for the CORESETs, however, the CORESET with the smaller CORESET ID may be selected.

Figure 4A:
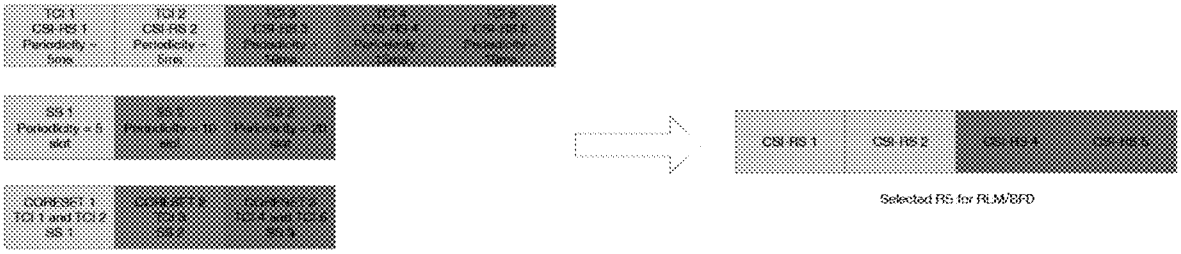
FIGS. 4A-4C are block diagrams illustrating examples of RS selection according to various exemplary embodiments.
Figure 4B:
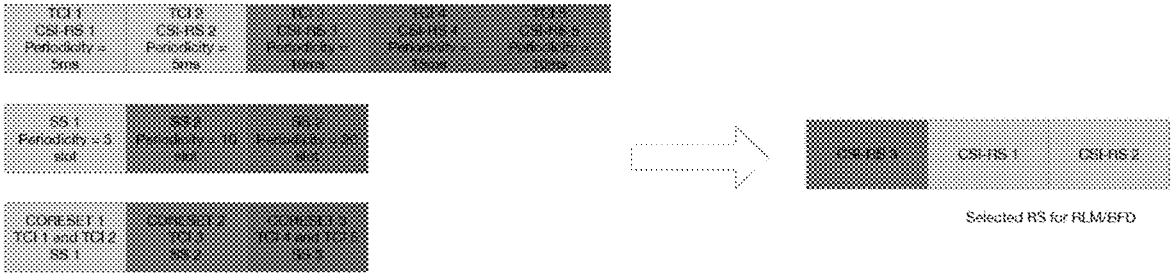
Figure 4C:
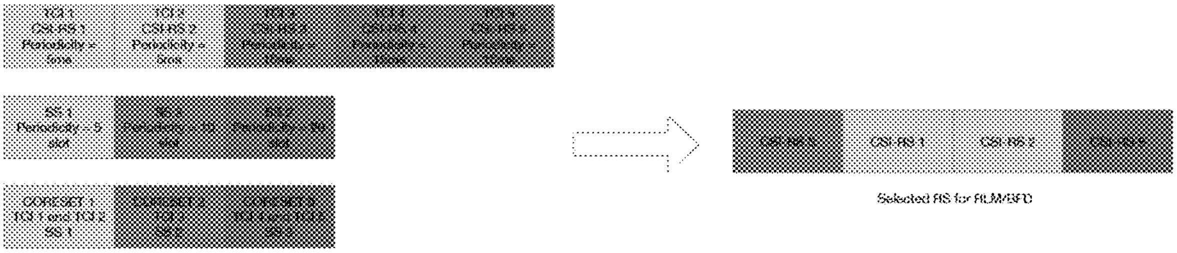

FIGS. 4A-4C are block diagrams illustrating examples of the RS selection process according to various exemplary embodiments. These figures provide visual examples of the selection processes discussed above in FIGS. 3A and 3B. It should be noted, however, that these visualizations are provided as examples and are in no way limiting of the number of different scenarios and criteria regarding RS selection by the UE.

In FIGS. 4A-4C, it is assumed that the UE 110 is only capable of utilizing a maximum of four (4) RSs for BFD/RLM purposes. As shown in FIGS. 4A-4C, five TCI states may be configured for three CORESETs configured by the gNB 120*a* or 120*b*. CORESET 1, which corresponds to SS 1, may include TCI 1 and TC2. CORESET 2, which corresponds to SS 2, may include TCI 3. CORESET 3, which corresponds to SS 3, may include TCI 4 and TCI 5. Each TCI state has a corresponding CSI-RS having a number corresponding to its respective TCI state.

In the example illustrated in FIG. 4A, the UE 110 selects the CORESETs based on the selection criteria described above, e.g., the CORESET having most TCI states is given first priority. In this case, since CORESET 1 and CORESET 3 have two TCIs compared to one for CORSET 2, these CORESETS are given priority and selected. This results in the selection of CSI-RS 1, CSI-RS 2, CSI-RS 4, and CSI-RS 5 for BFD/RLM purposes as shown in FIG. 4A. Because the maximum number of RSs were determined based on the first priority criteria, e.g., number of TCI states per CORESET, the further priority criteria, e.g., periodicity and CORESET ID were not used in this example. However, if less than the maximum number of RSs were selected based on the first priority criteria the additional criteria may be applied to result in the maximum number of RSs.

In some embodiments, the UE 110 may alternatively first select the CORESET with the smaller minimal periodicity among associated SSs. If the minimal periodicity is the same for the CORESETs, however, the CORESET with the smaller CORESET ID is selected. In some embodiments, the number of remaining RSs that can be used by the UE 110 for BFD/RLM may still be less than the number of active TCI states for a given CORESET. In some embodiments, the UE 110 may disregard (not select) such a CORESET.

The example illustrated in FIG. 4B shows an example selection process where the UE 110 prioritizes periodicity and disregards remaining CORESETS as described above. Thus, in this example, the UE 110 selects CORESET 1, which has a 5 ms periodicity, and CORESET 2, which has a 10 ms periodicity. This selection results in three RSs: CSI-RS 3, CSI-RS 1, and CSI-RS 2. Although the three RSs are less than the four the UE 110 is capable of utilizing, CORESET 3 has two TCI states configured. Selecting CORESET 3 would result in five RSs which is greater than the example maximum of four RSs and thus, the UE 110 cannot perform BFD/RLM for this CORESET. As such, CORESET 3 is disregarded and the three RSs initially selected are used.

In some embodiments, the UE 110 may fill in to the maximum number of RSs by selecting a subset of the TCI states for a particular CORESET. This selection of the subset of TCI states may be based on the periodicity of the RS of the TCI state (e.g., smallest periodicity) or, if the periodicity is the same, the TCI state ID (e.g., lowest TCI state ID).

The example illustrated in FIG. 4C is substantially similar to that of FIG. 4B. However, in FIG. 4C, instead of disregarding CORESET 3, the UE 110 uses the above described selection criteria to select one RS from CORESET 3 (the RS having a smaller periodicity). Thus, the resulting RSs are CSI-RS 3, CSI-RS 1, CSI-RS 2, and CSI-RS 5 that fills out the RSs to the maximum number of four in this example.

In some embodiments, the UE 110 may count the RSs corresponding to different TCI states activated for a CORESET as one (1) RS for BFD/RLM purposes. The number of CORESETs may still be determined using the periodicity of associated SSs and CORESET-IDs as explained above.

Returning to FIG. 3B, at 365, the UE 110, after selecting the RSs, may now use the measured RSs to determine the BFD and/or RLM.

Figure 3C:
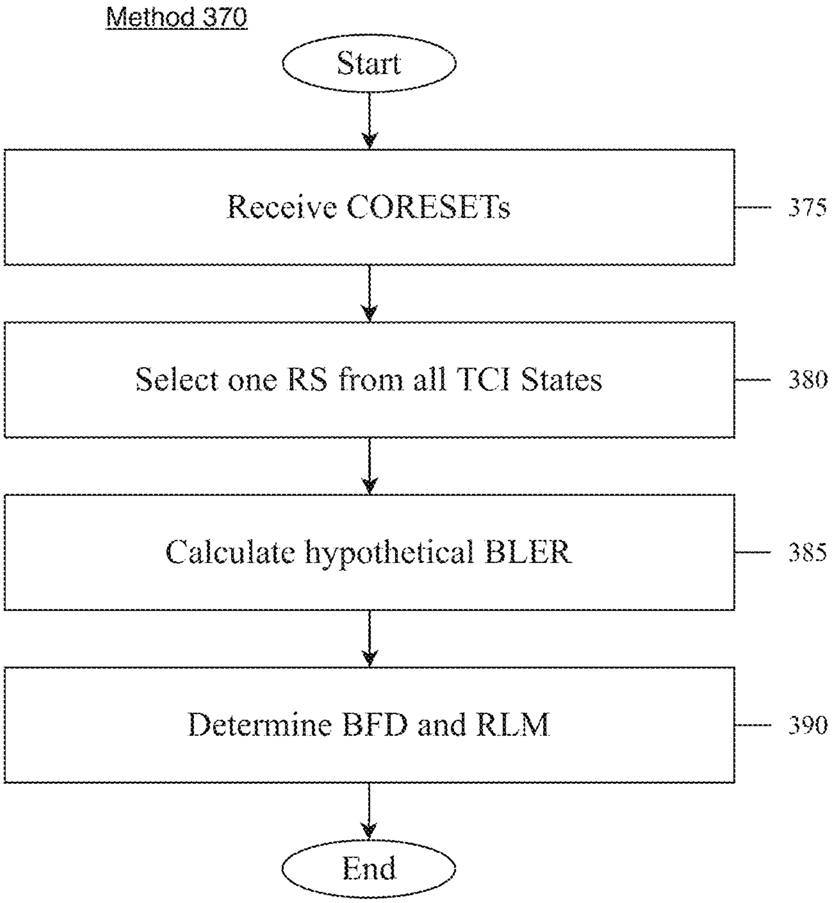
FIG. 3C shows a method of determining a RS for beam failure detection and radio link monitoring according to various exemplary embodiments.

FIG. 3C shows a method 370 of determining a RS for beam failure detection and radio link monitoring according to various exemplary embodiments. The method 370 is also performed by the UE 110 and allows for the selection of RSs to determine BFD and RLM. At 375, the UE 110 receives the CORESETs configured by the gNB 120A or 120B. At 380, the UE 110 selects one RS from all of the TCI states. In some embodiments, the selection of the single RS may be configured by the gNB by higher layer signaling (e.g., RRC signaling, medium access control (MAC) control element (CE), etc.).

In some embodiments, the UE 110 may select the RS based on one or more predetermined criteria. In some embodiments, the predetermined criteria may include, for example, the TCI state ID, the periodicity of the RS associated with the TCI, the resource type (e.g., periodic, aperiodic, semi-persistent), the RS resource ID, the measured or latest reported reference signal received power (RSRP) or SINR, and/or the transmission power. For example, the UE 110 may select the RS with the smallest periodicity. If two or more RSs have the same periodicity, the UE 110 may select the RS associated with the TCI having the lowest TCI state ID. Alternatively, the UE 110 may, for example, select the RS with the highest measured/reported RSRP or SINR. Alternatively, the UE 110 may, for example, select the RS having the highest transmission power.

At 385, the UE 110 calculates the hypothetical BLER based on the selected RS. At 390, the UE 110 determines BFD and RLM.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A non-transitory computer readable storage medium comprising a set of instructions, wherein the set of instructions when executed by a processor cause the processor of a user equipment (UE) to perform operations, comprising:

receiving a plurality of control resource sets (CORESETs);

selecting at least one reference signal (RS) corresponding to a plurality of activated transmission configuration indicator (TCI) states in a CORESET;

analyzing the at least one RS; and determining beam failure detection (BFD) based on the at least one reference signal selected, wherein the UE utilizes a predetermined maximum number of RSs for the BFD wherein, when the predetermined maximum number of RSs is less than the plurality of activated TCI states, the at least one RS is selected based on an associated search space (SS) with a smallest periodicity, wherein, when multiple associated SSs have the smallest periodicity, the at least one RS is selected based on the smallest periodicity and a CORESET ID.

2. The non-transitory computer readable storage medium of claim 1, wherein a plurality of RSs are configured in the plurality of CORESETs.

3. The non-transitory computer readable storage medium of claim 2, wherein analyzing the at least one RS comprises:

calculating a hypothetical block error rate (BLER) for the plurality of RSs; and comparing the hypothetical BLER with a predetermined threshold, wherein a beam failure instance or an out of sync instance is counted in response to the hypothetical BLER being greater than the predetermined threshold.

4. The non-transitory computer readable storage medium of claim 3, wherein the hypothetical BLER is determined for each of the plurality of RSs.

5. The non-transitory computer readable storage medium of claim 4, wherein the hypothetical BLER is determined using a maximum signal to interference and noise ratio (SINR) from all of the plurality of RSs.

6. The non-transitory computer readable storage medium of claim 4, wherein the hypothetical BLER is determined using a maximum power offset of a transmission power for each of the plurality of RSs.

7. The non-transitory computer readable storage medium of claim 1, wherein the operations are performed when a network does not explicitly configure a BFD reference signal.

8. The non-transitory computer readable storage medium of claim 1, wherein the plurality of CORESETs are configured by a g-node-B (gNB) of a 5G new radio (NR) network.

9. The non-transitory computer readable storage medium of claim 1, wherein the UE prioritizes a CORESET of the plurality of CORESETs with a higher number of active TCI states.

10. The non-transitory computer readable storage medium of claim 6, wherein the maximum power offset is communicated to the UE via radio resource control (RRC) signaling.

11. The non-transitory computer readable storage medium of claim 4, wherein the hypothetical BLER is determined using an average signal to interference and noise ratio (SINR) from all of the plurality of RSs.

12. The non-transitory computer readable storage medium of claim 4, wherein the hypothetical BLER is determined using an average power offset of a transmission power for each of the plurality of RSs.

13. A user equipment (UE), comprising:

a transceiver configured to connect to one or more g-NodeBs (gNBs);

a processor configured to:

receive a plurality of control resource sets (CORESETs) from the gNBs;

select at least one reference signal (RS) corresponding to a plurality of activated transmission configuration indicator (TCI) states in a CORESET;

analyze the at least one RS; and determine beam failure detection (BFD) based on the at least one reference signal selected, wherein the UE utilizes a predetermined maximum number of RSs for the BFD wherein, when the predetermined maximum number of RSs is less than the plurality of activated TCI states, the at least one RS is selected based on an associated search space (SS) with a smallest periodicity, wherein, when multiple associated SSs have the smallest periodicity, the at least one RS is selected based on the smallest periodicity and a CORESET ID.

14. The UE of claim 13, wherein a plurality of RSs are configured in the plurality of CORESETs.

15. The UE of claim 14, wherein the processor analyzes the at least one RS by:

calculating a hypothetical block error rate (BLER) for the plurality of RSs; and comparing the hypothetical BLER with a predetermined threshold, wherein a beam failure instance or an out of sync instance is counted in response to the hypothetical BLER being greater than the predetermined threshold.

16. The UE of claim 15, wherein the hypothetical BLER is determined for each of the plurality of RSs.

17. The UE of claim 15, wherein a combined hypothetical BLER is determined for all of the plurality of RSs.

18. The UE of claim 13, wherein the UE prioritizes a CORESET of the plurality of CORESETs with a higher number of active TCI states.

* * * * *